(12) United States Patent
Tanoura et al.

(10) Patent No.: US 8,281,577 B2
(45) Date of Patent: Oct. 9, 2012

(54) EXHAUST GAS PURIFICATION SYSTEM AND EXHAUST GAS PURIFICATION METHOD

(75) Inventors: Masazumi Tanoura, Yokohama (JP); Shuuji Fujii, Yokohama (JP); Masatoshi Katsuki, Yokohama (JP); Daishi Ueno, Tokyo (JP); Yuko Ujihara, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 108 days.

(21) Appl. No.: 12/679,840

(22) PCT Filed: Sep. 3, 2008

(86) PCT No.: PCT/JP2008/065808
§ 371 (c)(1),
(2), (4) Date: Jun. 9, 2010

(87) PCT Pub. No.: WO2009/041228
PCT Pub. Date: Apr. 2, 2009

(65) Prior Publication Data
US 2010/0242864 A1 Sep. 30, 2010

(30) Foreign Application Priority Data
Sep. 26, 2007 (JP) ................................. 2007-249317

(51) Int. Cl.
*F01N 3/10* (2006.01)
(52) U.S. Cl. ........... 60/301; 60/274; 60/275; 60/286; 60/297; 60/303; 423/580.1; 423/584; 423/652

(58) Field of Classification Search ............ 60/274, 60/275, 279, 281, 284, 286, 295, 297, 303, 60/309, 310, 311; 423/580.1, 584, 651, 652
See application file for complete search history.

(56) References Cited

U.S. PATENT DOCUMENTS

| 5,272,871 | A | * | 12/1993 | Oshima et al. | ............ 60/274 |
| 6,155,212 | A | * | 12/2000 | McAlister | ............ 123/3 |
| 6,235,245 | B1 | * | 5/2001 | Sherman et al. | ............ 422/562 |
| 6,272,849 | B1 | | 8/2001 | Zanini-Fisher et al. | |

(Continued)

FOREIGN PATENT DOCUMENTS

JP          63-10222 U     1/1988

(Continued)

OTHER PUBLICATIONS

International Search Report of PCT/JP2008/065808, mailing date of Dec. 9, 2008.

(Continued)

*Primary Examiner* — Binh Q Tran
(74) *Attorney, Agent, or Firm* — Westerman, Hattori, Daniels & Adrian, LLP

(57) ABSTRACT

An exhaust gas purification system, which upgrades exhaust gas purification while curtailing an increase in an operating cost, is disclosed. The exhaust gas purification system comprises an SCR catalyst for reducing and removing nitrogen oxides in an exhaust gas from an engine (10) by bringing the nitrogen oxides into contact with a reducing agent, oxidation catalysts (11, 17) for oxidizing gas components in the exhaust gas, a water electrolysis device (24) for producing oxygen by electrolyzing water, and an oxygen supply pipe (29) for supplying the oxygen produced by the water electrolysis device (24) to the exhaust gas.

10 Claims, 8 Drawing Sheets

U.S. PATENT DOCUMENTS

| | | | |
|---|---|---|---|
| 6,455,009 B1 * | 9/2002 | Kato et al. | 422/110 |
| 6,804,949 B2 * | 10/2004 | Andrews et al. | 60/272 |
| 6,981,367 B2 * | 1/2006 | Childs et al. | 60/275 |
| 7,302,795 B2 * | 12/2007 | Vetrovec | 60/309 |

FOREIGN PATENT DOCUMENTS

| | | |
|---|---|---|
| JP | 3-52323 U | 5/1991 |
| JP | 5-168856 A | 7/1993 |
| JP | 5-302549 A | 11/1993 |
| JP | 2001-129356 A | 5/2001 |
| JP | 2001-227327 A | 8/2001 |
| JP | 2001-295708 A | 10/2001 |
| JP | 2004-218475 A | 8/2004 |
| JP | 2005-248924 A | 9/2005 |
| JP | 2006-220119 A | 8/2006 |
| JP | 2007-187136 A | 7/2007 |

OTHER PUBLICATIONS

Japanese Office Action dated Nov. 8, 2011, issued in corresponding Japanese Patent Application No. 2007-249317.

Japanese Office Action dated Jul. 24, 2012, issued in corresponding Japanese Patent Application No. 2007-249317, (2 pages).

* cited by examiner

EXHAUST GAS PURIFICATION SYSTEM AND EXHAUST GAS PURIFICATION METHOD

TECHNICAL FIELD

This invention relates to an exhaust gas purification system and an exhaust gas purification method for purifying nitrogen oxides, etc. in an exhaust gas discharged from an internal combustion engine, the exhaust gas purification system and method being effective when applied, particularly, in purifying an exhaust gas discharged from the engine of an automobile.

BACKGROUND ART

Various exhaust gas purification systems for purifying nitrogen oxides in an exhaust gas discharged from an internal combustion engine, such as the engine of an automobile, have been developed. Patent Document 1 indicated below, for example, describes an exhaust gas purification system for purifying an exhaust gas of an internal combustion engine, the exhaust gas purification system having a selective catalytic reduction catalyst and a $NO_x$ occluding reduction type catalyst provided in series sequentially from an upstream side toward a downstream side in an exhaust gas flow-through direction of an exhaust passage of the internal combustion engine, and also having a reducing agent adding device provided upstream of the selective catalytic reduction catalyst.
Patent Document 1: JP-A-2004-218475

DISCLOSURE OF THE INVENTION

Problems to be Solved by the Invention

In the exhaust gas purification system of an internal combustion engine described in the above-mentioned Patent Document 1, when the exhaust gas is in a low temperature region at temperatures equal to or lower than a predetermined value, occlusion of nitrogen oxides is performed by the $NO_x$ occluding reduction type catalyst, whereas when the exhaust gas is in a high temperature region at temperatures higher than the predetermined value, a reducing agent is supplied to perform the reduction and removal of the nitrogen oxides by the selective catalytic reduction catalyst. By so doing, the exhaust gas is purified. Thus, when the $NO_x$ occluding reduction type catalyst has absorbed the nitrogen oxides in predetermined amounts or more, $NO_x$ regenerative combustion has to be carried out so as to restore its $NO_x$ occluding capacity, thereby increasing the operating cost. Concretely, retard of main injection or fuel injection, such as post-injection or multi-stage injection, is performed to change the combustion state of the engine temporarily, generating a rich spike gas. Since this rich combustion control is effected, fuel consumption is increased, resulting in an increased operating cost.

The present invention has been proposed in the light of the above-described problems. It is an object of the present invention to provide an exhaust gas purification system and an exhaust gas purification method which upgrade exhaust gas purification while curtailing the increase in the operating cost.

Means for Solving the Problems

An exhaust gas purification system, according to a first aspect of the invention for solving the above problems, comprises: a reduction catalyst for reducing and removing nitrogen oxides in an exhaust gas from an internal combustion engine by bringing the nitrogen oxides into contact with a reducing agent; an oxidation catalyst for oxidizing gas components in the exhaust gas; water electrolysis means for electrolyzing water to produce hydrogen and oxygen; hydrogen supply means for supplying the hydrogen produced by the water electrolysis means to an upstream side in an exhaust gas flow-through direction of the reduction catalyst; and oxygen supply means for supplying the oxygen produced by the water electrolysis means to the exhaust gas.

An exhaust gas purification system, according to a second aspect of the invention for solving the above problems, is the exhaust gas purification system according to the first aspect of the invention, wherein the reduction catalyst is disposed at a site of an exhaust path for discharge of the exhaust gas to an atmosphere, the site where a temperature of the exhaust gas is 200° C. or lower.

An exhaust gas purification system, according to a third aspect of the invention for solving the above problems, is the exhaust gas purification system according to the second aspect of the invention, wherein the reduction catalyst is disposed within a muffler for discharging the exhaust gas to the atmosphere.

An exhaust gas purification system, according to a fourth aspect of the invention for solving the above problems, is the exhaust gas purification system according to any one of the first to third aspects of the invention, wherein the oxygen supply means has first oxygen supply means for supplying the oxygen to an upstream side in the exhaust gas flow-through direction of the oxidation catalyst.

An exhaust gas purification system, according to a fifth aspect of the invention for solving the above problems, is the exhaust gas purification system according to any one of the first to fourth aspects of the invention, further comprising oxygen storage means for storing the oxygen produced by the water electrolysis means.

An exhaust gas purification system, according to a sixth aspect of the invention for solving the above problems, is the exhaust gas purification system according to any one of the first to fifth aspects of the invention, further comprising particulate matter removing means for trapping, burning and removing particulate matter contained in the exhaust gas, and wherein the oxygen supply means has second oxygen supply means for supplying the oxygen to an upstream side in the exhaust gas flow-through direction of the particulate matter removing means.

An exhaust gas purification system, according to a seventh aspect of the invention for solving the above problems, is the exhaust gas purification system according to the sixth aspect of the invention, further comprising: ozone producing means for producing ozone from the oxygen obtained by the water electrolysis means; and ozone supply means for supplying the ozone obtained by the ozone producing means to the upstream side in the exhaust gas flow-through direction of, at least, the oxidation catalyst among the oxidation catalyst and the particulate matter removing means.

An exhaust gas purification system, according to an eighth aspect of the invention for solving the above problems, is the exhaust gas purification system according to any one of the first to seventh aspects of the invention, further comprising: first gas component measuring means, disposed on the upstream side in the exhaust gas flow-through direction of the reduction catalyst, for measuring a concentration of the nitrogen oxides in the exhaust gas; and second gas component measuring means, disposed on a downstream side in the exhaust gas flow-through direction of the reduction catalyst, for measuring concentrations of the nitrogen oxides and the reducing agent in the exhaust gas.

An exhaust gas purification system, according to a ninth aspect of the invention for solving the above problems, is the exhaust gas purification system according to any one of the first to eighth aspects of the invention, further comprising water recovery means, disposed in a vicinity of an outlet of an exhaust passage for the exhaust gas, for recovering water in the exhaust gas, and wherein the water is at least one of the water recovered by the water recovery means, and water supplied from an outside.

An exhaust gas purification system, according to a tenth aspect of the invention for solving the above problems, is the exhaust gas purification system according to any one of the first to ninth aspects of the invention, further comprising: water storage means for storing the water; and water supply means for supplying the water stored in the water storage means to the water electrolysis means.

An exhaust gas purification system, according to an eleventh aspect of the invention for solving the above problems, is the exhaust gas purification system according to any one of the first to tenth aspects of the invention, which is installed on an automobile and wherein the internal combustion engine is an engine of the automobile.

An exhaust gas purification system, according to a twelfth aspect of the invention for solving the above problems, is the exhaust gas purification system according to the eleventh aspect of the invention, wherein the automobile has at least one of a car air conditioner, a cooling water reserve tank, and a rainwater storage tank, and the water is at least one of drain from the car air conditioner, cooling water within the cooling water reserve tank, and water within the rainwater storage tank.

An exhaust gas purification method, according to a thirteenth aspect of the invention for solving the above problems, is an exhaust gas purification method, comprising: supplying hydrogen produced by electrolysis of water to an upstream side in an exhaust gas flow-through direction of a reduction catalyst, the reduction catalyst being adapted to reduce and remove nitrogen oxides in an exhaust gas from an internal combustion engine by reacting the nitrogen oxides with a reducing agent; and supplying oxygen produced by the electrolysis of the water to the exhaust gas.

An exhaust gas purification method, according to a fourteenth aspect of the invention for solving the above problems, is the exhaust gas purification method according to the thirteenth aspect of the invention, further comprising supplying the oxygen produced by the electrolysis of the water to an upstream side in the exhaust gas flow-through direction of, at least, an oxidation catalyst among the oxidation catalyst and particulate matter removing means, the oxidation catalyst being adapted to oxidize gas components in the exhaust gas, and the particulate matter removing means being adapted to trap, burn and remove particulate matter in the exhaust gas.

Effects of the Invention

The exhaust gas purification system, according to the first aspect of the invention, comprises: a reduction catalyst for reducing and removing nitrogen oxides in an exhaust gas from an internal combustion engine by bringing the nitrogen oxides into contact with a reducing agent; an oxidation catalyst for oxidizing gas components in the exhaust gas; water electrolysis means for electrolyzing water to produce hydrogen and oxygen; hydrogen supply means for supplying the hydrogen produced by the water electrolysis means to an upstream side in an exhaust gas flow-through direction of the reduction catalyst; and oxygen supply means for supplying the oxygen produced by the water electrolysis means to the exhaust gas. Thus, the hydrogen produced by the water electrolysis means and the nitrogen oxides in the exhaust gas are brought into contact by the reduction catalyst, whereby the nitrogen oxides can be reduced and removed. The oxygen produced by the water electrolysis means is oxygen in the active stage, and this oxygen in the active stage can be supplied to the exhaust gas. The oxygen in the active stage accelerates the oxidation reaction of the gas components in the exhaust gas, and oxidizes hydrocarbons and carbon monoxide in the exhaust gas, so that the purification of the exhaust gas can be enhanced. As seen here, oxygen obtained by the water electrolysis means can be utilized effectively. Furthermore, the energy source of the water electrolysis means is electricity. If the exhaust gas purification system is applied to a vehicle, surplus electricity generated in a quantity equal to or more than the capacity of a battery installed in the vehicle can be utilized. Thus, increases in the energy consumption and the operating cost can be curtailed. The hydrogen produced by the water electrolysis means and the nitrogen oxides in the exhaust gas are brought into contact at the reduction catalyst, whereby the nitrogen oxides can be reduced and removed.

With the exhaust gas purification system according to the second aspect of the invention, the reduction catalyst is disposed at a site of an exhaust path for discharge of the exhaust gas to an atmosphere, the site where a temperature of the exhaust gas is 200° C. or lower. Thus, the same actions and effects as those of the exhaust gas purification system according to the first aspect of the invention are exhibited. Moreover, the exhaust gas temperature becomes 200° C. or lower, with the result that an oxidation reaction between oxygen contained in the exhaust gas and hydrogen as a reducing agent can be suppressed. At the reduction catalyst, nitrogen oxides in the exhaust gas and hydrogen as the reducing agent can be allowed to contact, whereby reduction and removal of the nitrogen oxides can be always performed. As a result, it is not necessary to use ammonia which has so far been used as a reducing agent when the exhaust gas temperature is high. Thus, an ammonia production device and a device for treating ammonia after passage through the reduction catalyst become unnecessary, so that the system can be rendered compact, and the cost for the system can be decreased.

With the exhaust gas purification system according to the third aspect of the invention, the reduction catalyst is disposed within a muffler for discharging the exhaust gas to the atmosphere. Thus, the same actions and effects as those of the exhaust gas purification system according to the second aspect of the invention are exhibited. Moreover, the muffler itself lowers the exhaust gas temperature, and an oxidation reaction between oxygen contained in the exhaust gas brought to the low temperature and hydrogen as a reducing agent can be suppressed more reliably. At the reduction catalyst, nitrogen oxides in the exhaust gas and hydrogen as the reducing agent can be allowed to contact, whereby reduction and removal of the nitrogen oxides can be always performed. As a result, it is not necessary to use ammonia which has so far been used as a reducing agent when the exhaust gas temperature is high. Thus, an ammonia production device and a device for treating ammonia after passage through the reduction catalyst become unnecessary, so that the system can be rendered compact, and the cost for the system can be decreased. Further, the flow velocity of the exhaust gas flowing through the site of installation of the reduction catalyst is so low that the duration of contact between the nitrogen oxides in the exhaust gas and the reduction catalyst is lengthened to increase the reduction reaction rate of the nitrogen oxides. Consequently, the amount of the reduction catalyst disposed at the above-mentioned site can be decreased, and a compact system and cost reduction can be realized. The water condensed within the muffler can be utilized for the production of hydrogen and oxygen by the water electrolysis means. Therefore, there is no need to separately install the supply source for water as a material for the hydrogen and oxygen, and the complicacy of operation of the system due to the separate supply of water can be suppressed.

With the exhaust gas purification system according to the fourth aspect of the invention, the oxygen supply means has first oxygen supply means for supplying the oxygen to an upstream side in the exhaust gas flow-through direction of the oxidation catalyst. Thus, the same actions and effects as those of the exhaust gas purification systems according to the first to third aspects of the invention are exhibited. Moreover, the oxygen produced by the water electrolysis means is oxygen in the active stage, and this oxygen in the active stage can accelerate the oxidation of hydrocarbons and carbon monoxide in the exhaust gas by the oxidation catalyst. When surplus ammonia is contained in the exhaust gas, the oxygen in the active stage can also promote the oxidation of the surplus ammonia. Thus, the exhaust gas can be purified even further. Accordingly, the amount of the oxidation catalyst necessary for oxidizing gas components in the exhaust gas can be decreased, the compactness of the system can be achieved, and the cost can be reduced.

The exhaust gas purification system according to the fifth aspect of the invention further comprises oxygen storage means for storing the oxygen produced by the water electrolysis means. Thus, the same actions and effects as those of the exhaust gas purification systems according to the first to fourth aspects of the invention are exhibited. Moreover, surplus oxygen, which has been produced by the water electrolysis means, but not supplied to the exhaust gas, can be stored in the oxygen storage means, and oxygen can be supplied, as required, to the exhaust gas. As seen here, this surplus oxygen can be utilized effectively.

With the exhaust gas purification system according to the sixth aspect of the invention, this system is equipped with particulate matter removing means for trapping particulate matter contained in the exhaust gas, and burning and removing the particulate matter, and the oxygen supply means has second oxygen supply means for supplying the oxygen to an upstream side in the exhaust gas flow-through direction of the particulate matter removing means. Thus, the same actions and effects as those of the exhaust gas purification systems according to the first to fifth aspects of the invention are exhibited. Moreover, the oxygen produced by the water electrolysis means is oxygen in the active stage, and this oxygen in the active stage enables fine particles trapped by the particulate matter removing means to be burned and removed at a low temperature, and the exhaust gas can be purified even further.

The exhaust gas purification system according to the seventh aspect of the invention further comprises: ozone producing means for producing ozone from the oxygen obtained by the water electrolysis means; and ozone supply means for supplying the ozone obtained by the ozone producing means to the upstream side in the exhaust gas flow-through direction of, at least, the oxidation catalyst among the oxidation catalyst and the particulate matter removing means. Thus, the same actions and effects as those of the exhaust gas purification system according to the sixth aspect of the invention are exhibited. Since ozone itself has high activity, the ozone accelerates the oxidation, at the oxidation catalyst, of hydrocarbons and carbon monoxide in the exhaust gas. When surplus ammonia is contained in the exhaust gas, the ozone can promote its oxidation. Moreover, the ozone can burn and remove, at a low temperature, particulate matter trapped by the particulate matter removing means, so that the exhaust gas can be purified even further. Accordingly, the amount of the oxidation catalyst necessary for oxidizing gas components in the exhaust gas can be decreased, and compactness of the system and cost reduction can be achieved.

The exhaust gas purification system according to the eighth aspect of the invention further comprises: first gas component measuring means, disposed on the upstream side in the exhaust gas flow-through direction of the reduction catalyst, for measuring a concentration of the nitrogen oxides in the exhaust gas; and second gas component measuring means, disposed on a downstream side in the exhaust gas flow-through direction of the reduction catalyst, for measuring concentrations of the nitrogen oxides in the exhaust gas and the reducing agent. Thus, the same actions and effects as those of the exhaust gas purification systems according to the first to seventh aspects of the invention are exhibited. Moreover, the type of the reducing agent added to the exhaust gas, and the amount of the reducing agent added can be specified based on the gas components in the exhaust gas, so that the exhaust gas can be purified with even better efficiency.

The exhaust gas purification system according to the ninth aspect of the invention further comprises water recovery means, disposed in a vicinity of an outlet of an exhaust passage for the exhaust gas, for recovering water in the exhaust gas, and is one in which the water is at least one of the water recovered by the water recovery means, and water supplied from an outside. Thus, the same actions and effects as those of the exhaust gas purification systems according to the first to eighth aspects of the invention are exhibited. Moreover, a plurality of supply sources for water are available, so that the decline in versatility due to water can be suppressed.

The exhaust gas purification system according to the tenth aspect of the invention further comprises water storage means for storing the water, and water supply means for supplying the water stored in the water storage means to the water electrolysis means. Thus, the same actions and effects as those of the exhaust gas purification systems according to the first to ninth aspects of the invention are exhibited. Moreover, the water can be stored by the water storage means, the water stored in the water storage means can be supplied by the water supply means to the water electrolysis means, and hydrogen can be produced reliably by the water electrolysis means. Thus, versatility can be improved.

The exhaust gas purification system according to the eleventh aspect of the invention is installed on an automobile, and is one in which the internal combustion engine is an engine of the automobile. Thus, the same actions and effects as those of the exhaust gas purification systems according to the first to tenth aspects of the invention are exhibited. Moreover, the water electrolysis means can produce hydrogen and oxygen by utilizing surplus electricity generated by a battery installed in the automobile. Thus, the complicacy of operation of the system due to the separate supply of energy for actuating the water electrolysis means can be suppressed. Besides, it becomes possible to suppress increases in the energy consumption and operating cost.

With the exhaust gas purification system according to the twelfth aspect of the invention, the automobile has at least one of a car air conditioner, a cooling water reserve tank, and a rainwater storage tank, and the water is at least one of drain from the car air conditioner, cooling water within the cooling water reserve tank, and water within the rainwater storage tank. Thus, the same actions and effects as those of the exhaust gas purification system according to the eleventh aspect of the invention are exhibited. Moreover, drain from the car air conditioner, cooling water within the cooling water reserve tank, and water within the rainwater storage tank can be utilized for the production of hydrogen and oxygen by the water electrolysis means. Therefore, there is no need to separately install the supply source for water as a material for the hydrogen and oxygen, and the complicacy of operation of the system due to the separate supply of water can be suppressed.

The exhaust gas purification method according to the thirteenth aspect of the invention comprises: supplying hydrogen produced by electrolysis of water to an upstream side in an exhaust gas flow-through direction of a reduction catalyst, the reduction catalyst being adapted to reduce and remove nitrogen oxides in an exhaust gas from an internal combustion engine by reacting the nitrogen oxides with a reducing agent; and supplying oxygen produced by the electrolysis of the water to the exhaust gas. Thus, the oxygen produced by the electrolysis is oxygen in the active stage, and the oxygen in the active stage is supplied to the exhaust gas. This oxygen in the active stage accelerates the oxidation reaction of gas components in the exhaust gas, and oxidizes hydrocarbons and carbon monoxide in the exhaust gas, so that the purification of the exhaust gas can be improved. As seen here, oxygen produced by the electrolysis can be utilized effectively. Furthermore, the energy source for the electrolysis is electricity. If the exhaust gas purification system is applied to an automobile, surplus electricity generated in excess of the capacity of the battery installed in the automobile can be utilized. Thus, it becomes possible to suppress increases in the energy consumption and operating cost. Hydrogen produced by electrolysis of water and nitrogen oxides in the exhaust gas are brought into contact at the reduction catalyst, whereby the nitrogen oxides can be reduced and removed.

The exhaust gas purification method according to the fourteenth aspect of the invention further comprises supplying the oxygen produced by the electrolysis of the water to an upstream side in the exhaust gas flow-through direction of, at least, an oxidation catalyst among the oxidation catalyst and particulate matter removing means, the oxidation catalyst being adapted to oxidize gas components in the exhaust gas, and the particulate matter removing means being adapted to trap, burn and remove particulate matter in the exhaust gas. Thus, the same actions and effects as those of the exhaust gas purification system according to the thirteenth aspect of the invention are exhibited. Moreover, oxygen produced by the electrolysis of water is supplied to the upstream side in the exhaust gas flow-through direction of, at least, the oxidation catalyst among the oxidation catalyst and the particulate matter removing means. The oxygen produced by the water electrolysis means is oxygen in the active stage, and this oxygen in the active stage can accelerate the oxidation of hydrocarbons and carbon monoxide in the exhaust gas by the oxidation catalyst. When surplus ammonia is contained in the exhaust gas, the oxygen in the active stage can also promote the oxidation of the surplus ammonia. Thus, the exhaust gas can be purified even further.

DESCRIPTION OF THE NUMERALS AND SYMBOLS

1 engine body, 2 intake passage, 3 exhaust manifold (collecting exhaust pipe), 4 EGR valve, 5 exhaust gas circulation passage (EGR pipe), 10 engine, 11 first oxidation catalyst, 12 first communication piping, 13 diesel particulate filter (DPF), 14 second communication piping, 15 $NO_x$ purification device, 16 third communication piping, 17 second oxidation catalyst, 18 muffler, 19 microreactor, 20 fuel, 21 adsorbent, 22 reducing agent supply pipe, 23 water recovery device, 24 water electrolysis device, 25 first water supply pipe, 26 communication pipe, 27 oxygen adsorbent, 28 supply pipe for oxygen and water, 29 oxygen supply pipe, 30 hydrogen feed pipe, 31, 32, 33, 34 sensor, 41 electronic control device (ECU), 50, 60, 70, 80, 90 exhaust gas purification system, 61 oxygen supply pipe, 62 first communication piping, 63 second communication piping, 64 third communication piping, 71 fourth communication piping, 81 hydrogen communication pipe, 82 hydrogen storage device, 83, 91 hydrogen feed pipe, 98 muffler.

BEST MODE FOR CARRYING OUT THE INVENTION

The best mode of an exhaust gas purification system and an exhaust gas purification method according to the present invention will be described concretely based on the accompanying drawings.

First Embodiment

A first embodiment, in which the exhaust gas purification system and the exhaust gas purification method according to the present invention are applied to purification of an exhaust gas discharged from an automobile, will be described using FIGS. 1 to 4.

Figure 1:
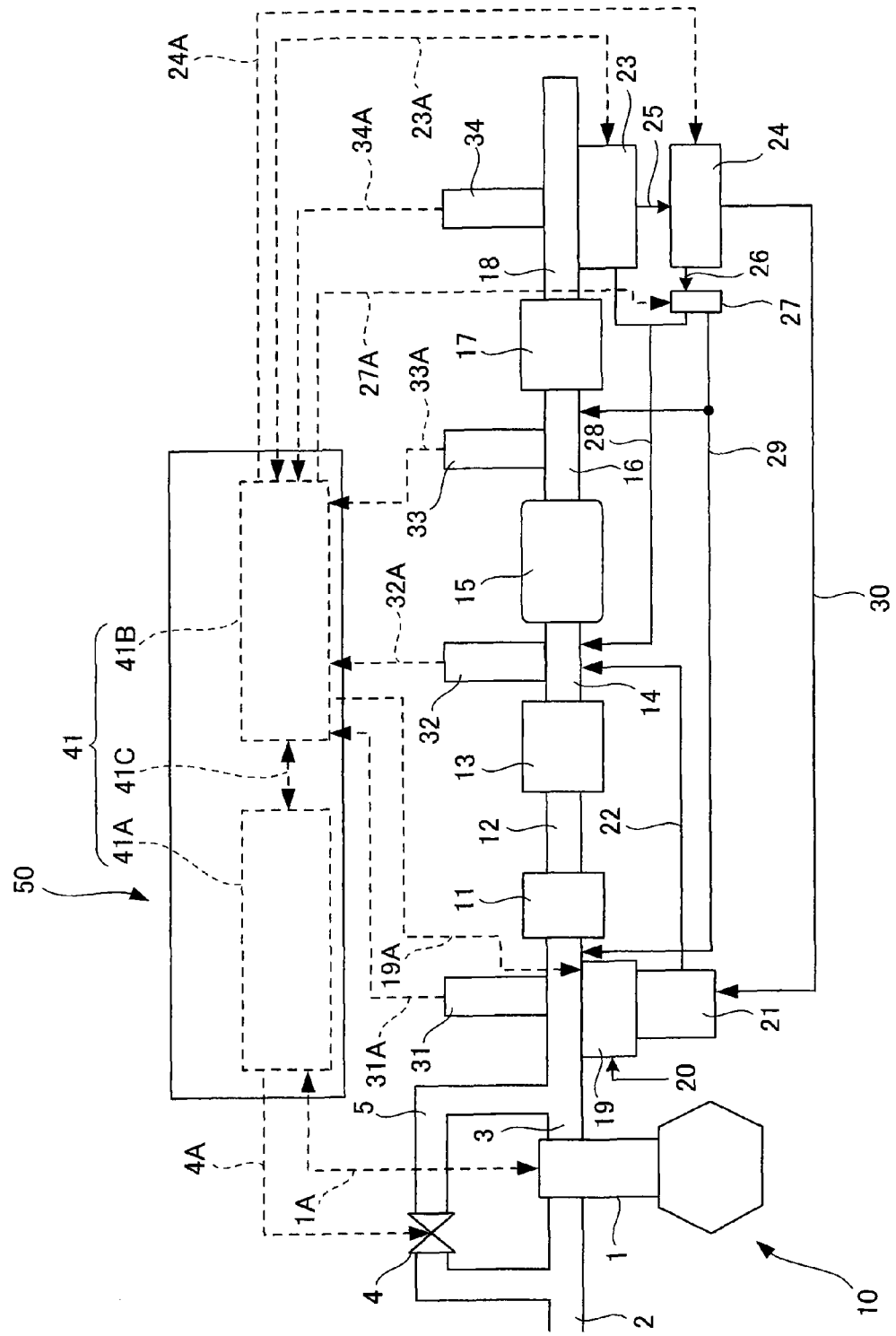
FIG. 1 is a schematic configurational drawing of a first embodiment of an exhaust gas purification system according to the present invention.
Figure 2:
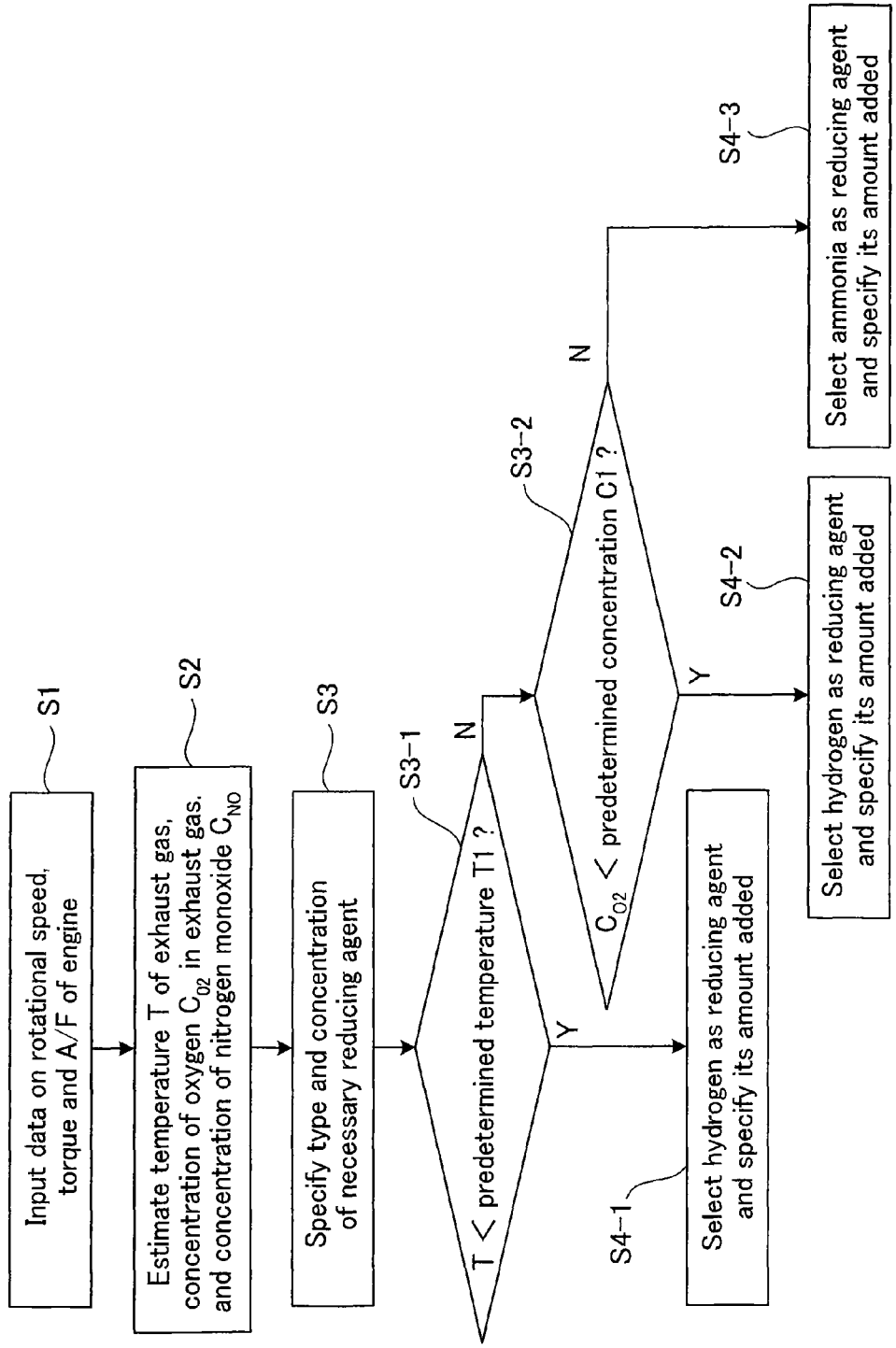
FIG. 2 is a view showing a control flow for the first embodiment of the exhaust gas purification system according to the present invention.
Figure 3:
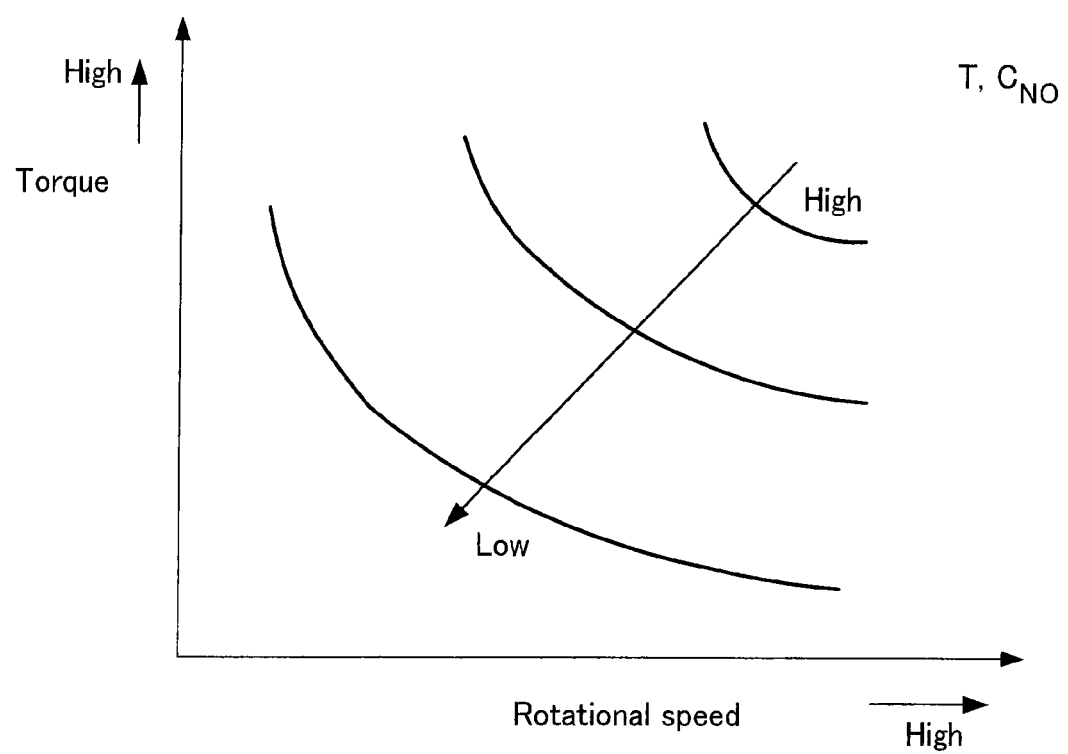
FIG. 3 is a data map showing an example of an exhaust gas temperature distribution and a nitrogen monoxide concentration distribution represented in correlation with the number of revolutions or rotational speed and torque of an engine.
Figure 4:
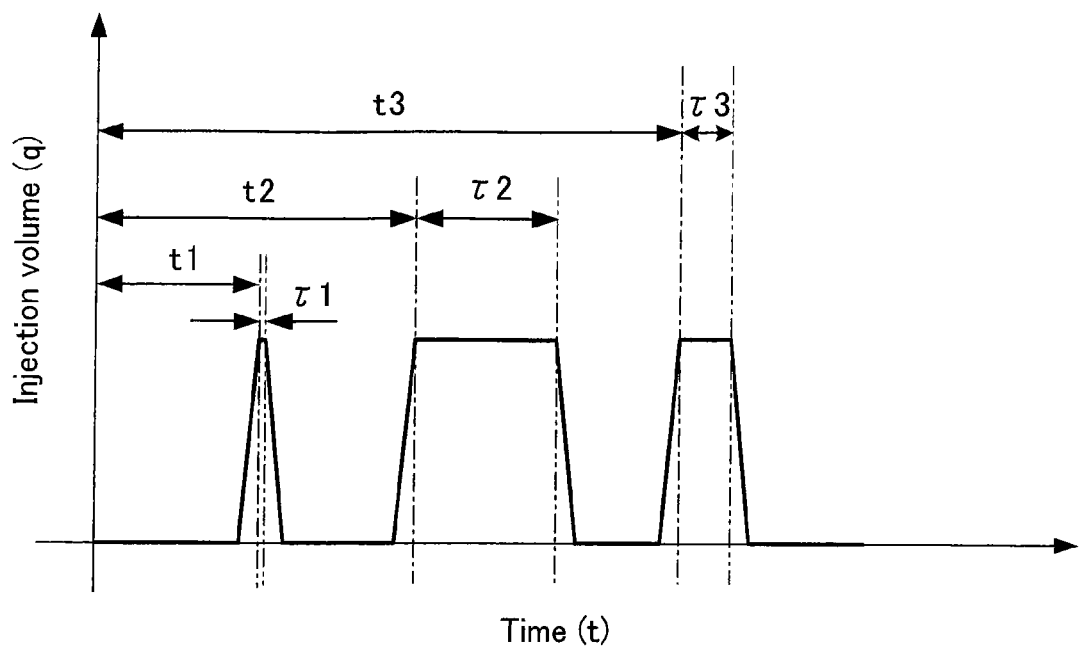
FIG. 4 is a view showing an example of the injection timing and injection period of fuel by a fuel injection valve.

FIG. 1 is a schematic configurational drawing of the exhaust gas purification system, and FIG. 2 is a view showing its control flow. FIG. 3 is a data map showing an example of an exhaust gas temperature distribution and a nitrogen monoxide concentration distribution represented in correlation with the rotational speed and torque of an engine. FIG. 4 is a view showing an example of the injection timing and injection period of fuel by a fuel injection valve.

An exhaust gas purification system 50 according to the present embodiment, as shown in FIG. 1, is used for purification of an exhaust gas discharged upon combustion of fuel in an engine 10 which is an internal combustion engine, such as a diesel engine or a gasoline engine of an automobile. This exhaust gas contains nitrogen oxides, sulfur oxides, and particulate matter (hereinafter referred to as PM). The engine 10 has an engine body 1, an intake passage 2 connected to the engine body 1 for taking air into the engine body 1, and an exhaust manifold (collecting exhaust pipe) 3 connected to the engine body 1 for discharging the exhaust gas from the engine body 1.

An exhaust gas circulation passage (hereinafter referred to as an EGR pipe) 5 is provided for connecting the collecting exhaust pipe 3 and the intake passage 2 via an EGR valve 4 which is an opening and closing valve. That is, the EGR valve 4 and the EGR pipe 5 constitute an exhaust gas circulating means. The engine body 1 has an electronic controlled fuel injection valve (fuel injection means), for example, of a common rail type. The electronic controlled fuel injection valve can perform post-injection as auxiliary injection or sub-injection of fuel which is performed after main injection. That is, the electronic controlled fuel injection valve, as shown, for example, in FIG. 4, can inject fuel for a first predetermined period $\tau 1$ after t1, inject fuel for a second predetermined period $\tau 2$ ($>\tau 1$) after t2 ($>$t1), and inject fuel for a third predetermined period $\tau 3$ ($<\tau 2$) after t3 ($>$t2). As seen here, the electronic controlled fuel injection valve is a fuel injection valve which can adjust the fuel injection timing and the fuel injection period (injection volume). The EGR valve 4 and a combustion control block 41A of an electronic control device (hereinafter referred to as ECU) 41 to be described later are connected by an EGR valve control line 4A, and the opening and closing of the EGR valve 4 are controlled by the combustion control block 41A. Accordingly, the opening and closing of the EGR valve 4 are controlled, and the fuel injection timing and injection period are adjusted by the electronic controlled fuel injection valve, under the control of the ECU 41, whereby the oxygen concentration in the exhaust gas can be adjusted to less than a predetermined value. The EGR valve 4, the EGR pipe 5, and the electronic controlled fuel injection valve constitute an oxygen concentration adjusting means.

At an end portion on a downstream side in an exhaust gas flow-through direction of the collecting exhaust pipe 3, a $NO_x$ purification device 15 is provided to be connected via a first oxidation catalyst 11, first communication piping 12, a particulate filter (hereinafter referred to as DPF) 13, and second communication piping 14. The $NO_x$ purification device 15 has a $NO_x$-occluding catalyst which occludes $NO_x$, and a selective reduction catalyst (hereinafter referred to as SCR catalyst). On the downstream side in the exhaust gas flow-through direction of the $NO_x$ purification device 15, a second oxidation catalyst 17 is provided in such a manner as to be connected via third communication piping 16. A muffler 18 is provided downstream, in the exhaust gas flow-through direction, of the second oxidation catalyst 17, and the exhaust gas is discharged from the muffler 18 into the atmosphere.

A microreactor 19, which is a reducing agent adding means, is provided in contact with the above-mentioned collecting exhaust pipe 3, and the microreactor 19 is disposed on the upstream side in the exhaust gas flow-through direction of the first oxidation catalyst 11. The microreactor 19 and a post-treatment control block 41B of the ECU 41 (to be described later) are connected by a reactor control line 19A, and the microreactor 19 is controlled by the post-treatment control block 41B. The microreactor 19 is supplied with fuel 20 such as hydrocarbon, oxygen in the air or oxygen obtained by a water electrolysis device 24 (to be described later), and water stored in a tank or water obtained by a water recovery device 23 (to be described later). These substances react in a second reaction section (second microreactor) to form hydrogen, carbon monoxide, carbon dioxide, and water. That is, in the second reaction section, there occur partial oxidation which forms hydrogen, carbon dioxide and water from the fuel 20 and oxygen, steam reforming which forms hydrogen and carbon dioxide from the fuel 20 and water (steam), and autothermal reforming which forms hydrogen and carbon dioxide from the fuel 20, oxygen and water. Further, hydrogen dispensed partly from these products, and nitrogen in the air or nitrogen monoxide in the exhaust gas are supplied, and they are reacted in a first reaction section (first microreactor) to form ammonia. Thus, the first reaction section of the microreactor 19 mentioned above constitutes an ammonia adding means for adding ammonia, as a reducing agent, to the exhaust gas of the internal combustion engine.

Examples of a catalyst in the second reaction section disposed in the microreactor 19 are steam reforming catalysts, reforming catalysts of the metal-supporting type, such as nickel-based catalysts and ruthenium-based catalysts, those of the compound oxide type, such as perovskites, and partial oxidation catalysts. Examples of a catalyst in the first reaction section are metal oxide catalysts such as $Fe_3O_4$, and metal-supporting type catalysts such as ruthenium-based catalysts. These catalysts may be of any shape such as a honeycomb form or a particulate form. However, the microreactor 19 is disposed in contact with the collecting exhaust pipe 3, and is disposed to be thermally connected to the engine 10. Thus, heat obtained from the collecting exhaust pipe 3 can be utilized as a heat source for the reaction temperature of 500° C. or higher for steam reforming and autothermal reforming in the second reaction section and for the reaction in the first reaction section. Accordingly, there is no need to provide a heat source separately, and an increase in the equipment cost can be held down.

An adsorbent (adsorbent for a reducing agent) 21 for storing ammonia and hydrogen formed in the above-mentioned microreactor 19 is provided to be disposed adjacent the microreactor 19. A first reducing agent supply pipe 22 is provided for communication between the adsorbent 21 and the second communication piping 14. Examples of the adsorbent for ammonia (ammonia occluding means) are zeolite-based catalysts. Examples of the adsorbent for hydrogen (hydrogen occluding means) are carbon-based materials or metal-based materials (hydrogen absorbing or storage alloys) such as palladium. By providing the adsorbent 21 at such a position, surplus hydrogen and ammonia formed by the microreactor 19 can be stored, and the stored reducing agents can be supplied, if necessary, to the upstream side, in the exhaust gas flow-through direction, of the $NO_x$ purification device 15 through the reducing agent supply pipe 22, with the result that the resulting reducing agent can be utilized effectively for the SCR catalyst. Such adsorbent 21 may be arranged in each reaction section, or may be disposed only at a position corresponding to the reaction section placed on the downstream side in the exhaust gas flow-through direction.

The aforementioned first oxidation catalyst 11 is exemplified by catalysts based on precious metals such as platinum, palladium and iridium, or catalysts based on compound oxides such as perovskites. The first oxidation catalyst 11 is a catalyst which is formed in a honeycomb shape and causes an oxidation reaction at 200° C. or higher. HC, CO and NO in the exhaust gas are oxidized at the first oxidation catalyst 11. Thus, the reduction rate of the SCR catalyst disposed downstream in the exhaust gas flow-through direction is increased.

The aforementioned DPF 13 adsorbs PM in the exhaust gas. After a predetermined amount of PM has been adsorbed, the electronic controlled fuel injection valve performs post-injection as sub-injection after main injection to bring the exhaust gas temperature to a high temperature, thereby making it possible to burn and remove PM adsorbed to the DPF 13. Oxygen which has been obtained by the water electrolysis device 24 (to be described later) may be supplied to the upstream side in the exhaust gas flow-through direction in the vicinity of the DPF 13.

The aforementioned SCR catalyst has a first reduction catalyst which reacts hydrogen as a reducing agent with nitrogen oxides in the exhaust gas to reduce and remove the nitrogen oxides (i.e., hydrogen-selective reduction catalyst), and a second reduction catalyst which reacts ammonia as a reducing agent with nitrogen oxides in the exhaust gas to reduce and remove the nitrogen oxides (i.e., ammonia-selective reduction catalyst). The first reduction catalyst is exemplified by zeolite-based catalysts. The reaction temperature of this catalyst is 100° C. or higher. The second reduction catalyst is exemplified by zeolite-based catalysts and vanadium oxides such as vanadium-titania. The reaction temperature of this catalyst is 250° C. or higher.

Examples of the aforementioned second oxidation catalyst 17 are the same catalysts as the aforementioned first oxidation catalyst 11. By providing the second oxidation catalyst 17 at this position, surplus ammonia (unreacted ammonia) which has not been utilized in the reaction on the upstream side in the exhaust gas flow-through direction is oxidized and converted into nitrogen and water, whereby release of ammonia to the atmosphere can be prevented. Moreover, hydrocarbons and carbon monoxide in the exhaust gas are oxidized to be changed into carbon dioxide and water, whereby release of hydrocarbons and carbon monoxide to the atmosphere can be prevented.

The water recovery device 23, which is a water recovery means for recovering water (steam) in the exhaust gas, is provided adjacent the aforementioned muffler 18. Concretely, the water recovery device 23 is a device which also recovers water condensed inside the muffler 18. A water storage device (not shown), such as a water tank, which is a water storage means for storing water recovered by the water recovery device 23, water supplied from the outside, and waste water (drain) from a car air conditioner, is disposed adjacent the water recovery device 23. Water recovered by the water recovery device 23 is fed to the water storage device via a water feed pipe (water feed means; not shown). The water recovery device 23 and the post-treatment control block 41B of the ECU 41 (to be described later) are connected by a water recovery device control signal line 23A, and the water recovery device 23 is controlled by the post-treatment control block 41B. A filter, for example, may be provided within the water recovery device 23 to remove impurities in the exhaust gas from water.

The above-mentioned water storage device is connected to the water electrolysis device 24 via a first water supply pipe (first water supply means) 25, and is also connected to the microreactor 19 via a second water supply pipe (second water supply means; not shown). The automobile is equipped with a cooling water reserve tank (not shown) for storing cooling water for the engine 10, and a rainwater storage tank (not shown) for saving rainwater for emergency. The cooling water reserve tank and the rainwater storage tank are connected to the microreactor 19 and the water electrolysis device 24 through piping for feeding water within these tanks. The water electrolysis device 24 electrolyzes water to form hydrogen and oxygen. Thus, water accumulated in the above water storage device can be supplied to the water electrolysis device 24 and the microreactor 19, and water can be utilized effectively as a material for the water electrolysis device 24 and the microreactor 19. Furthermore, hydrogen can be reliably produced by the microreactor 19 to enhance versatility. The water electrolysis device 24 and the post-treatment control block 41B of the ECU 41 to be described later are connected by a water electrolysis device control signal line 24A, and the water electrolysis device 24 is controlled by the post-treatment control block 41B.

An oxygen adsorbent (oxygen occluding means) 27 for occluding oxygen, such as a zeolite-based catalyst, is provided in the vicinity of the water electrolysis device 24, and the water electrolysis device 24 and the oxygen adsorbent (oxygen occluding means) 27 are connected via a communication pipe 26. By providing the oxygen adsorbent 27, surplus oxygen produced by the water electrolysis device 24 can be stored and desorbed, where necessary, and the oxygen can be utilized effectively. The oxygen adsorbent 27 and the post-treatment control block 41B of the ECU 41 to be described later are connected by an oxygen adsorbent control signal line 27A, and the oxygen adsorbent 27 is controlled by the post-treatment control block 41B. The water electrolysis device 24 communicates with the adsorbent 21 via a hydrogen feed pipe 30, and hydrogen formed by the water electrolysis device 24 is fed to the adsorbent 21. Thus, the water electrolysis device 24 and the second reaction section of the microreactor 19 mentioned above constitute a hydrogen adding means for adding hydrogen as a reducing agent to the exhaust gas of the engine 10. Further, the second reaction section of the microreactor 19 and the water electrolysis device 24, respectively, constitute a first and a second hydrogen producing means for producing hydrogen. By so providing the water electrolysis device 24 for producing hydrogen from water, hydrogen can be produced even with the use of water aside from fuel, thus improving versatility. A supply pipe 28 for oxygen and water is provided for bringing the water recovery device 23 and the oxygen adsorbent 27 into communication with the second communication pipe 14, so that oxygen and water can be supplied, as required, to the upstream side in the exhaust gas flow-through direction of the $NO_x$ purification device 15 through the supply pipe 28 for oxygen and water. Further, an oxygen supply pipe 29 for establishing communication among the oxygen adsorbent 27, the collecting exhaust pipe 3, and the third communication piping 16 is provided. Thus, oxygen obtained by the water electrolysis device 24 (oxygen in the active stage) can be supplied, as required, to the first oxidation catalyst 11 and the second oxidation catalyst 17 through the oxygen supply pipe 29. Since the oxygen produced by the water electrolysis device 24 is oxygen in the active stage, as mentioned above, it can promote the oxidation of the exhaust gas in the first and second oxidation catalysts 11 and 17.

The aforementioned collecting exhaust pipe 3, second communication piping 14, third communication piping 16 and muffler 18 are provided, respectively, with sensors 31, 32, 33 and 34 which are exhaust gas measuring means for constantly measuring the temperature and components ($NO_x$, $O_2$, $H_2$, $NH_3$) of the exhaust gas. Examples of the respective sensors 31, 32, 33 and 34 are sensors using laser light, such as gas component concentration sensors of the molecular laser light absorption high-speed response type. The use of such sensors makes it possible to measure the temperature of the exhaust gas and the gas components in the exhaust gas in real time.

The above sensors 31, 32, 33 and 34 and the post-treatment control block 41B of the ECU 41 are connected by signal lines 31A, 32A, 33A and 34A, respectively, so that data obtained from measurements by the sensors 31, 32, 33 and 34 are sent to the post-treatment control block 41B. Sensors (not shown) for measuring the (operating) state of the engine 10 (rotational speed and torque of the engine, fuel volume for intake air in the engine, etc.) and the aforementioned electronic controlled fuel injection valve, etc. are connected to the combustion control block 41A of the ECU 41 by a combustion control signal line 1A. The state of the engine 10 measured by the sensors is transmitted to the combustion control block 41A, while the electronic controlled fuel injection valve, etc. are controlled by the combustion control block 41A. The combustion control block 41A and the post-treatment control block 41B are connected by a block-to-block (hereinafter referred to as interblock) control line 41C, and transmission and reception of data can be performed between the combustion control block 41A and the post-treatment control block 41B. Based on a control flow to be described later, the opening and closing control of the EGR valve 4 and the control of the aforementioned post-injection by the electronic controlled fuel injection valve are exercised by the combustion control block 41A. The post-treatment control block 41B exercises the control of the microreactor 19 (selecting the type of the reducing agent and specifying its concentration), the control of the water recovery device 23, the control of the water electrolysis device 24, and the control of the oxygen adsorbent 27. The engine 10 is provided with sensors (not shown) for measuring the cylinder pressure of the internal combustion engine, and the temperature of a combustion gas within the cylinder of the internal combustion engine, respectively, and data from measurements by these sensors are transmitted to the ECU 41.

The control flow in the above-mentioned ECU 41 will be concretely described using FIG. 2.

First of all, in Step S1, data (the rotational speed and torque of the engine, the fuel volume responsive to the amount of intake air, as mentioned above, and the temperature of cooling water) obtained by measuring the state of the internal combustion engine are inputted to the combustion control block 41A of the ECU 41.

Subsequently, the program proceeds to Step S2 to estimate the temperature of the exhaust gas, the oxygen concentration $C_{O2}$ in the exhaust gas, and the nitrogen monoxide concentration $C_{NO}$ in the exhaust gas, in correlation with the resulting data on the state of the internal combustion engine, based on a map of the temperature distribution of the exhaust gas and the concentration distribution of nitrogen monoxide in the exhaust gas, the map prepared beforehand. As shown in FIG. 3, for example, the ECU 41 estimates the temperature T of the exhaust gas, the oxygen concentration $C_{O2}$ in the exhaust gas, and the nitrogen monoxide concentration $C_{NO}$ in the exhaust gas, such that in the case of a low rotational speed and a low torque, the exhaust gas has a low temperature and contains a low concentration of nitrogen monoxide, and in the case of a high rotational speed and a high torque, the exhaust gas has a high temperature and contains a high concentration of nitrogen monoxide. The ECU 41 also predicts the concentration of nitrogen oxides, $D_{NOX}$, in the exhaust gas on the basis of the following predictive equation based on the aforementioned state of the internal combustion engine and the amounts of change, if the concentration of nitrogen oxides in the exhaust gas at the next moment cannot be predicted from the map at the time of deceleration or acceleration in a high load region during high speed rotations.

Predictive equation for $NO_x$:

$$D_{NOX} = f(n, P1, \ldots, Px, T1, \ldots, Tx, \ldots, \Delta n, \ldots, \Delta X)$$

n: Current rotational speed of internal combustion engine
Px: Pressure in particular portion of engine (e.g., cylinder pressure)
Tx: Temperature in particular portion of engine (e.g., temperature of combustion gas within cylinder)
$\Delta n$: Current amount of change in rotational speed
$\Delta x$: Current amount of change at particular portion of engine (including amount of full accelerator pedal depression, engine load (hill, slip), etc.)

Then, the program proceeds to Step S3 to specify the type and concentration of the reducing agent required. Concretely, it is determined in Step S3-1 whether the temperature of the exhaust gas is in a temperature region lower than a predetermined value T1 (low-temperature region) or in a temperature region equal to or higher than the predetermined value T1 (high-temperature region). The predetermined value T1 is exemplified by the upper limit temperature of a temperature region in which hydrogen can be used as a reducing agent, no matter what the oxygen concentration in the exhaust gas is. An example of the predetermined value T1 is 250° C. If, in this Step S3-1, the temperature of the exhaust gas estimated in the above Step S2 is lower than 250° C. (is in the low-temperature region), the program proceeds to Step S4-1. In other case, namely, if the temperature of the exhaust gas is equal to or higher than 250° C. (is in the high-temperature region), the program proceeds to Step S3-2.

In Step S3-2, it is determined whether the oxygen concentration $C_{O2}$ in the exhaust gas is lower than a predetermined concentration C1 or the oxygen concentration $C_{O2}$ in the exhaust gas is equal to or higher than the predetermined concentration C1. The predetermined concentration C1 is exemplified by 1%, the upper limit concentration at which the reaction between hydrogen and oxygen in the exhaust gas minimally proceeds when the hydrogen is added as the reducing agent. If, in this Step S3-2, the concentration of oxygen in the exhaust gas estimated in the above Step S2 is lower than the predetermined concentration C1, the program proceeds to Step S4-2. In other case, namely, if the oxygen concentration in the exhaust gas is equal to or higher than the predetermined concentration C1, the program proceeds to step S4-3.

Then, in Steps S4-1 and S4-2, hydrogen is selected as a reducing agent, and its amount of addition is set. In Step S4-2, however, the amount of hydrogen added may be smaller than the amount of addition of hydrogen set in Step S4-1, because the amount of hydrogen added is set depending on the oxygen concentration in the exhaust gas. In Step S4-3, ammonia is selected as a reducing agent, and its amount of addition is set.

The aforementioned exhaust gas purification system 50 comprises: the SCR catalyst for reducing and removing nitrogen oxides in the exhaust gas from the engine 10 by bringing the nitrogen oxides into contact with the reducing agent; the oxidation catalysts 11, 17 for oxidizing gas components in the exhaust gas; the water electrolysis device 24 for electrolyzing water to produce hydrogen and oxygen; the hydrogen feed pipe 30 for supplying the hydrogen produced by the water electrolysis device 24 to the upstream side in the exhaust gas flow-through direction of the SCR catalyst; and the oxygen/water supply pipe 28 and the oxygen supply pipe 29 for supplying the oxygen produced by the water electrolysis device 24 to the exhaust gas. Thus, the oxygen produced by the water electrolysis device 24 is oxygen in the active stage, and this oxygen in the active stage can be supplied to the exhaust gas. The oxygen in the active stage accelerates the oxidation reaction of gas components in the exhaust gas, and oxidizes hydrocarbons and carbon monoxide in the exhaust gas, so that the purification of the exhaust gas can be improved. As seen here, oxygen obtained by the water electrolysis device 24 can be utilized effectively. Furthermore, the energy source of the water electrolysis device 24 is electricity, and surplus electricity generated in excess of the capacity of the battery installed in the automobile can be utilized. Thus, it becomes possible to suppress increases in the energy consumption and operating cost due to the separate supply of energy for actuating the water electrolysis device 24. Besides, the complicacy of operation of the system can be suppressed, and system upsizing and cost increase due to the installation of an instrument for storing only the energy can also be suppressed. In addition, hydrogen produced by the water electrolysis device 24 and nitrogen oxides in the exhaust gas are brought into contact at the SCR catalyst, whereby the nitrogen oxides can be reduced and removed.

The oxygen produced by the water electrolysis device 24 is supplied to the upstream side in the exhaust gas flow-through direction of the oxidation catalysts 11, 17. As described above, this oxygen produced by the water electrolysis device 24 is oxygen in the active stage, and this oxygen in the active stage can accelerate the oxidation of hydrocarbons and carbon monoxide in the exhaust gas by the oxidation catalysts 11, 17. When surplus ammonia is contained in the exhaust gas, the oxygen in the active stage can also promote the oxidation of the surplus ammonia. Thus, the exhaust gas can be purified even further. Accordingly, the amounts of the oxidation catalysts 11, 17 necessary for oxidizing gas components in the exhaust gas can be decreased, the compactness of the system can be achieved, and the cost can be reduced.

The exhaust gas purification system 50 is equipped with the sensors 31, 32, as the first gas component concentration measuring means, disposed on the upstream side in the exhaust gas flow-through direction of the SCR catalyst for measuring the concentrations of nitrogen oxides and oxygen in the exhaust gas, and the sensors 33, 34, as the second gas component concentration measuring means, disposed on the downstream side in the exhaust gas flow-through direction of the SCR catalyst for measuring the concentrations of nitrogen oxides, ammonia and hydrogen in the exhaust gas. Thus, the type of the reducing agent added to the exhaust gas, and the amount of the reducing agent added can be specified based on the gas components in the exhaust gas. Concretely, the amount of addition of the reducing agent required can be specified by measuring the concentration of $NO_R$. By measuring the concentration of oxygen, it can be determined which of hydrogen and ammonia is effective as the reducing agent. The amount of the reducing agent added can be specified by measuring the concentration of ammonia (leak ammonia) on the downstream side in the exhaust gas flow-through direction of the SCR catalyst. Further, the amount of the reducing agent added can be specified by measuring the concentration of hydrogen on the downstream side in the exhaust gas flow-through direction of the SCR catalyst. Accordingly, the type of the reducing agent added, and the amount of the reducing agent added can be controlled, so that the exhaust gas can be purified even more efficiently.

The above-mentioned water is at least one of water recovered by the water recovery device 23 and water supplied from the outside. Thus, a plurality of supply sources for water are available, so that the decline in versatility due to water can be suppressed.

Since the water storage device and the first water supply pipe 25 are provided, the water can be accumulated in the water storage device. Moreover, water accumulated in the water storage device can be supplied by the first water supply pipe 25 to the water electrolysis device 24. The water electrolysis device 24 can produce hydrogen more reliably to enhance versatility.

The automobile has at least one of the car air conditioner, the cooling water reserve tank, and the rainwater storage tank. Thus, drain from the car air conditioner, cooling water within the cooling water reserve tank, and water within the rainwater storage tank can be utilized for the production of hydrogen and oxygen by the water electrolysis device 24. Therefore, there is no need to separately install the supply source for water as a material for the hydrogen and oxygen, and the complicacy of operation of the system due to the separate supply of water can be suppressed.

According to the exhaust gas purification system 50, the following advantages are further exhibited: Even in the high-temperature region where hydrogen has not been used as the reducing agent, because hydrogen added to the exhaust gas reacts with oxygen contained in the exhaust gas, and the temperature of the exhaust gas is equal to or higher than the predetermined value, the oxygen concentration in the exhaust gas discharged from the engine 10 is adjusted to less than the predetermined value by the post-injection by the electronic controlled fuel injection valve and the circulation of a part of the exhaust gas to the intake passage 2 by the EGR valve 4 and the EGR pipe 5. By so doing, the reaction between hydrogen from the microreactor 19 and oxygen in the exhaust gas is suppressed, and hydrogen from the microreactor 19 and nitrogen oxides in the exhaust gas are reacted by the SCR catalyst, with the result that the nitrogen oxides can be reduced and removed. Accordingly, in the high temperature region, the nitrogen oxides in the exhaust gas can be reduced and removed by the reduction catalyst with the use of hydrogen as the reducing agent.

The ECU 41 is provided for controlling the microreactor 19 so as to add ammonia to the exhaust gas when the temperature of the exhaust gas is equal to or higher than the predetermined value. By this measure, when the temperature of the exhaust gas is equal to or higher than the predetermined value, ammonia from the microreactor 19 and the nitrogen oxides in the exhaust gas are reacted in the SCR catalyst, whereby the nitrogen oxides can be reduced and removed. Hence, in the entire temperature region, the nitrogen oxides in the exhaust gas can be reduced and removed to purify the exhaust gas.

The post-injection by the electronic controlled fuel injection valve, and the circulation through the EGR valve 4 and the EGR pipe 5 decrease the oxygen concentration in the exhaust gas. Thus, the oxygen concentration in the exhaust gas can be decreased reliably.

Furthermore, when at least one of the temperature of the exhaust gas and the oxygen concentration in the exhaust gas is less than the predetermined value, the microreactor 19 is controlled so as to add hydrogen to the exhaust gas. When both of the temperature of the exhaust gas and the oxygen concentration in the exhaust gas are equal to or higher than the predetermined values, the microreactor 19 is controlled so as to add ammonia to the exhaust gas. By providing the ECU 41 exercising these types of control, hydrogen or ammonia is selectively used as the reducing agent according to the conditions, and the nitrogen oxides in the exhaust gas can be reduced and removed by the SCR catalyst. In addition, as compared with the customary practice in which a reducing agent is selected according to the temperature of the exhaust gas, hydrogen can be used as a reducing agent at the oxygen concentration in the exhaust gas of less than the predetermined value, even in the high-temperature region in which the temperature of the exhaust gas is equal to or higher than the predetermined value. In the high-temperature region, therefore, the nitrogen oxides in the exhaust gas can be reduced and removed by the SCR catalyst using hydrogen as the reducing agent. When the temperature of the exhaust gas and the oxygen concentration in the exhaust gas are both equal to or higher than the predetermined values, moreover, ammonia from the microreactor 19 and the nitrogen oxides in the exhaust gas are reacted in the SCR catalyst, whereby the nitrogen oxides can be reduced and removed. Hence, in the entire temperature region, the nitrogen oxides in the exhaust gas can be reduced and removed to purify the exhaust gas.

When hydrogen or ammonia is produced in the microreactor 19, it is produced from the fuel 20. Since the fuel 20 is utilized in the engine 10, there is no need to incorporate a material supply source for hydrogen or ammonia separately, making it possible to curtail an increase in the equipment cost. Furthermore, the production of hydrogen or ammonia can be performed within the exhaust gas purification system. Thus, versatility is enhanced.

The sensors 31, 32, 33 and 34 are provided, and the microreactor 19 is controlled to determine the temperature and components of the exhaust gas from at least one of the data map based on information from the sensors 31, 32, 33 and 34, the state of the engine 10, and the aforementioned predictive equation, and to adjust the amount of the reducing agent added. Thus, the state of the engine 10 can be measured, or the current state of the engine 10 can be estimated from at least one of the data map based on the measured state of the engine 10, the state of the engine 10, and the predictive equation. As a result, more appropriate control can be exercised according to the state of the engine 10, and a transient measure can be taken.

The data map is a map of the temperature distribution of the exhaust gas and the concentration distribution of the nitrogen oxides in the exhaust gas, the map prepared beforehand in correlation with respective data on the rotational speed and torque of the engine 10 and the amount of fuel in response to intake air in the engine 10. Thus, the state of the engine 10 can be estimated more reliably. As a result, the exhaust gas can be purified more reliably.

The predictive equation is a mathematical expression for calculating the concentration of nitrogen oxides in the exhaust gas based on the rotational speed of the engine 10, the cylinder pressure of the engine 10, the temperature of the combustion gas within the cylinder of the engine 10, the amount of change in the rotational speed of the internal combustion engine, and the amount of change at a predetermined location of the internal combustion engine. Thus, even if prediction is impossible with the data map, the state of the engine 10 can be predicted reliably. As a result, the exhaust gas can be purified even more reliably.

In the foregoing descriptions, an explanation has been offered for the exhaust gas purification system 50 which exercises the following control: The temperature of the exhaust gas, the oxygen concentration $C_{O2}$ in the exhaust gas, and the nitrogen monoxide concentration $C_{NO}$ are estimated based only on the map of the temperature distribution of the exhaust gas and the concentration distribution of nitrogen monoxide in the exhaust gas, the map prepared beforehand in correlation with the data on the internal combustion engine. Based on these estimations, the type of the reducing agent is selected, and its concentration is specified. However, the data on the temperature of the exhaust gas and its gas components measured by the sensors 31, 32, 33 and 34 and sent to the ECU 41 may be reflected in the above-mentioned data map, and control may be exercised based thereon. Alternatively, the data on the temperature of the exhaust gas and its gas components sent to the ECU 41 may be used, and fine adjustment may be directly made by feedback control using the data. According to the exhaust gas purification system involving such control, the same actions and effects as those in the above exhaust gas purification system 50 are exhibited, the selection of the reducing agent and the specification of its concentration can be performed more accurately, and denitration performance can be enhanced. Further, control can be exercised according to the state of the engine 10, and a transient measure can be taken.

An explanation has been offered using the exhaust gas purification system 50 for purifying the exhaust gas of the engine 10 having the EGR valve 4, the EGR pipe 5, and the electronic controlled fuel injection valve. However, the system may be used for the purification of the exhaust gas from the internal combustion engine having only the EGR valve and the EGR pipe or only the electronic controlled fuel injection valve. Such system exhibits the same actions and effects as those of the above-mentioned exhaust gas purification system 50.

An explanation has been offered using the exhaust gas purification system 50 having the microreactor 19 and the water electrolysis device 24 as the hydrogen adding means. However, the exhaust gas purification system may have only one of the microreactor and the water electrolysis device as the hydrogen adding means. Even such an exhaust gas purification system exhibits the same actions and effects as those of the above-mentioned exhaust gas purification system 50.

Electrical discharge at a low temperature may be performed between two electrodes by a high voltage in an oxygen atmosphere to produce ozone, and this ozone may be fed to the upstream side, in the exhaust gas flow-through direction, of at least the first and second oxidation catalysts 11 and 17 among the first and second oxidation catalysts 11 and 17 and the DPF 13. Since ozone itself has high activity, the ozone accelerates the oxidation, at the first and second oxidation catalysts 11 and 17, of hydrocarbons, carbon monoxide and surplus ammonia in the exhaust gas, whereby the exhaust gas can be purified even more efficiently. Moreover, the ozone can burn and remove, at a low temperature, particulate matter trapped by the DPF 13, so that the exhaust gas can be purified even further. Accordingly, the amounts of the first and second oxidation catalysts 11 and 17 necessary for oxidizing gas components in the exhaust gas can be decreased, and compactness of the system and cost reduction can be achieved.

Second Embodiment

A second embodiment, in which the exhaust gas purification system and the exhaust gas purification method according to the present invention are applied to purification of an exhaust gas discharged from an automobile, will be described concretely using FIG. 5.

Figure 5:
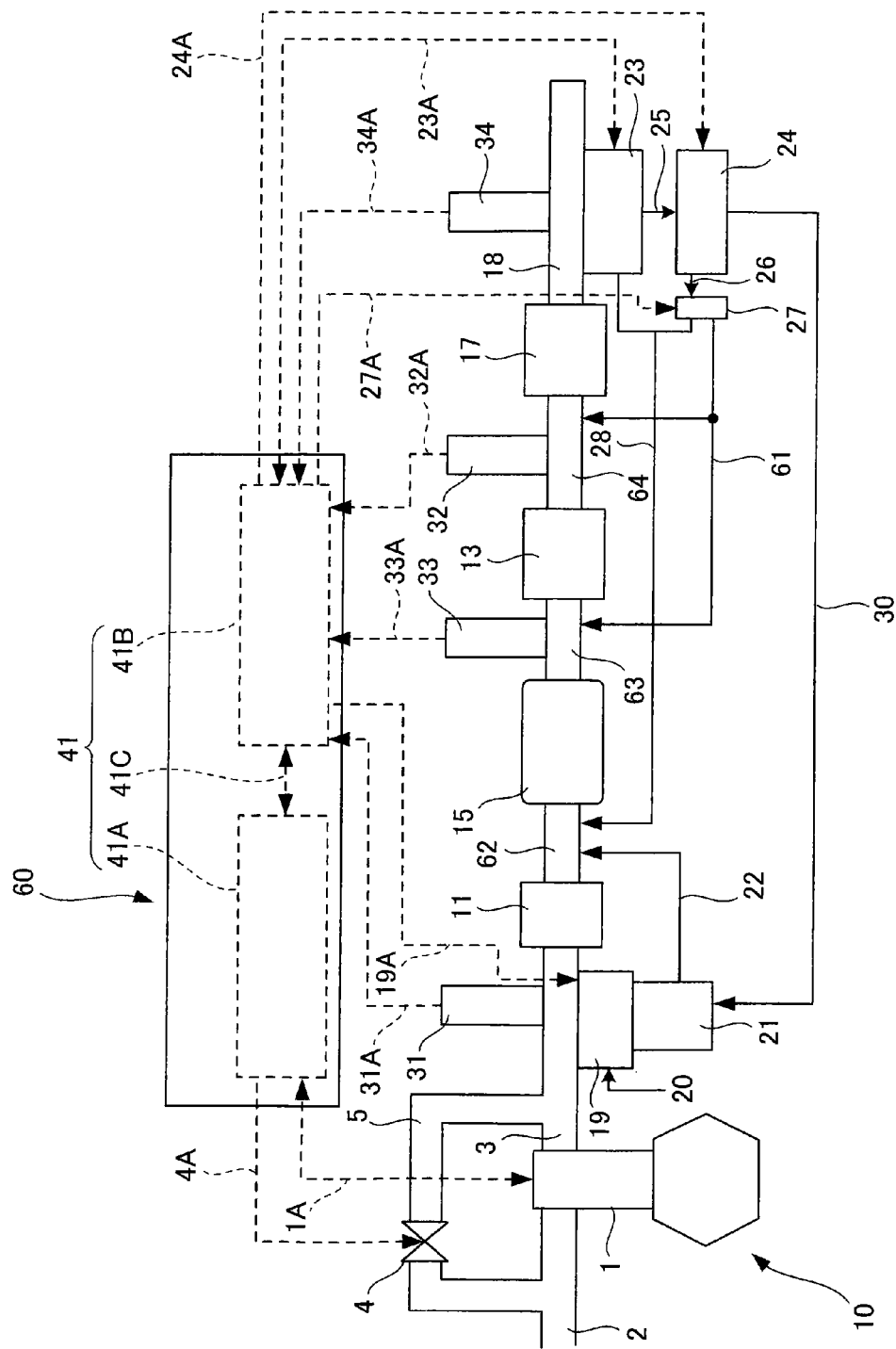
FIG. 5 is a schematic configurational drawing of a second embodiment of an exhaust gas purification system according to the present invention.

FIG. 5 is a schematic configurational drawing of the exhaust gas purification system.

The exhaust gas purification system according to the second embodiment of the present invention is one in which the positions of the DPF and the SCR catalyst provided in the exhaust gas purification system according to the first embodiment of the present invention described above are interchanged, and a feed pipe for feeding oxygen obtained by the water electrolysis device to the upstream side in the exhaust gas flow-through direction in the vicinity of the DPF is added. The other features are the same as those in the exhaust gas purification system according to the first embodiment of the present invention.

In the exhaust gas purification system according to the second embodiment of the present invention, the same devices as those in the above-mentioned exhaust gas purification system according to the first embodiment of the present invention are assigned the same numerals as those in the latter system, and their explanations are omitted.

An exhaust gas purification system 60 according to the second embodiment of the present invention, as shown in FIG. 5, has a collecting exhaust pipe 3, a first oxidation catalyst 11, a $NO_x$ purification device 15, a DPF 13, and a second oxidation catalyst 17 arranged in this order on an exhaust path for an exhaust gas of an engine 10 from the upstream side toward the downstream side in the exhaust gas flow-through direction. However, the first oxidation catalyst 11 and the $NO_x$ purification device 15, the $NO_x$ purification device 15 and the DPF 13, and the DPF 13 and the second oxidation catalyst 17 are brought into communication by first, second and third communication pipings 62, 63 and 64, respectively.

An oxygen supply pipe (second oxygen supply means) 61 for establishing communication among an oxygen adsorbent 27, the second communication piping 63, and the third communication piping 64 is provided. Thus, oxygen obtained by a water electrolysis device 24 (oxygen in the active stage) can be supplied, as required, to the DPF 13 and the second oxidation catalyst 17 through the oxygen supply pipe 61.

The above-described exhaust gas purification system 60 is provided with the oxygen supply pipe 61 for supplying oxygen produced by the water electrolysis device 24 to the upstream side in the exhaust gas flow-through direction of the DPF 13. Therefore, the same actions and effects as those of the exhaust gas purification system 50 according to the aforementioned first embodiment are exhibited. Moreover, the oxygen produced by the water electrolysis device 24 is oxygen in the active stage, as stated above. The oxygen in the active stage enables PM trapped by the DPF 13 to be burned and removed at 300° C., which is a temperature lower than 600° C. being the conventional removal temperature. That is, PM trapped by the DPF 13 can be burned and removed, even without post-injection (auxiliary injection) by the electronic controlled fuel injection valve which supplies fuel to the exhaust gas to raise the temperature of the exhaust gas.

The exhaust gas purification system 60 has the DPF 13, and the first oxygen supply means 61 for supplying oxygen to the upstream side in the exhaust gas flow-through direction of the DPF 13. Thus, oxygen obtained in the water electrolysis device 24, which is oxygen in the active stage, enables PM trapped by the DPF 13 to be burned and removed at a low temperature, and the exhaust gas can be purified even further.

Electrical discharge at a low temperature may be performed between two electrodes by a high voltage in an oxygen atmosphere to produce ozone, and this ozone may be fed to the DPF 13. Since ozone itself has high activity, the ozone can burn and remove, at a low temperature, PM trapped by the DPF 13, so that the exhaust gas can be purified even further.

Figure 6:
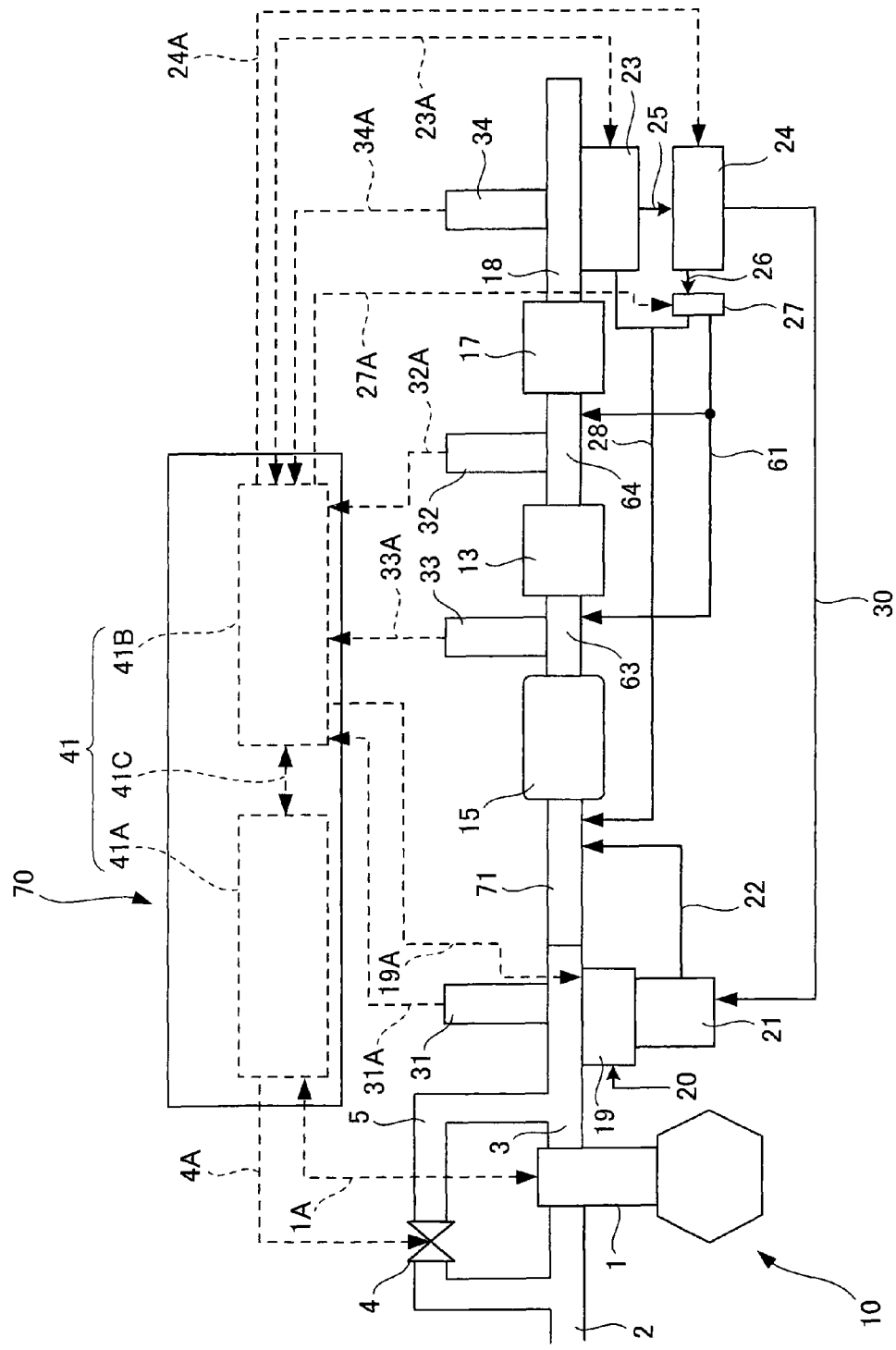
FIG. 6 is a schematic configurational drawing showing another example of the second embodiment of the exhaust gas purification system according to the present invention.

The present embodiment has been described using the exhaust gas purification system 60 having the first oxidation catalyst 11 disposed on the upstream side, in the exhaust gas flow-through direction, of the SCR catalyst. As shown in FIG. 6, however, an exhaust gas purification system 70 having a $NO_x$ purification device 15 connected to an end of the collecting exhaust pipe 3 via fourth communication piping 71 may be provided, without disposition of the first oxidation catalyst on the upstream side in the exhaust gas flow-through direction of the SCR catalyst. Even such an exhaust gas purification system 70 exhibits the same actions and effects as those of the above-mentioned exhaust gas purification system 60. Furthermore, oxygen produced by the water electrolysis device 24 is supplied to the upstream side in the exhaust gas flow-through direction of the $NO_x$ purification device 15. By so doing, the oxidation of nitrogen monoxide contained in the exhaust gas can be accelerated to form nitrogen dioxide. Thus, the installation of the oxidation catalyst at the stage preceding the $NO_x$ purification device 15 can be omitted, and the equipment cost can be decreased.

Third Embodiment

A third embodiment, in which the exhaust gas purification system and the exhaust gas purification method according to the present invention are applied to purification of an exhaust gas discharged from an automobile, will be described using FIG. 7.

Figure 7:
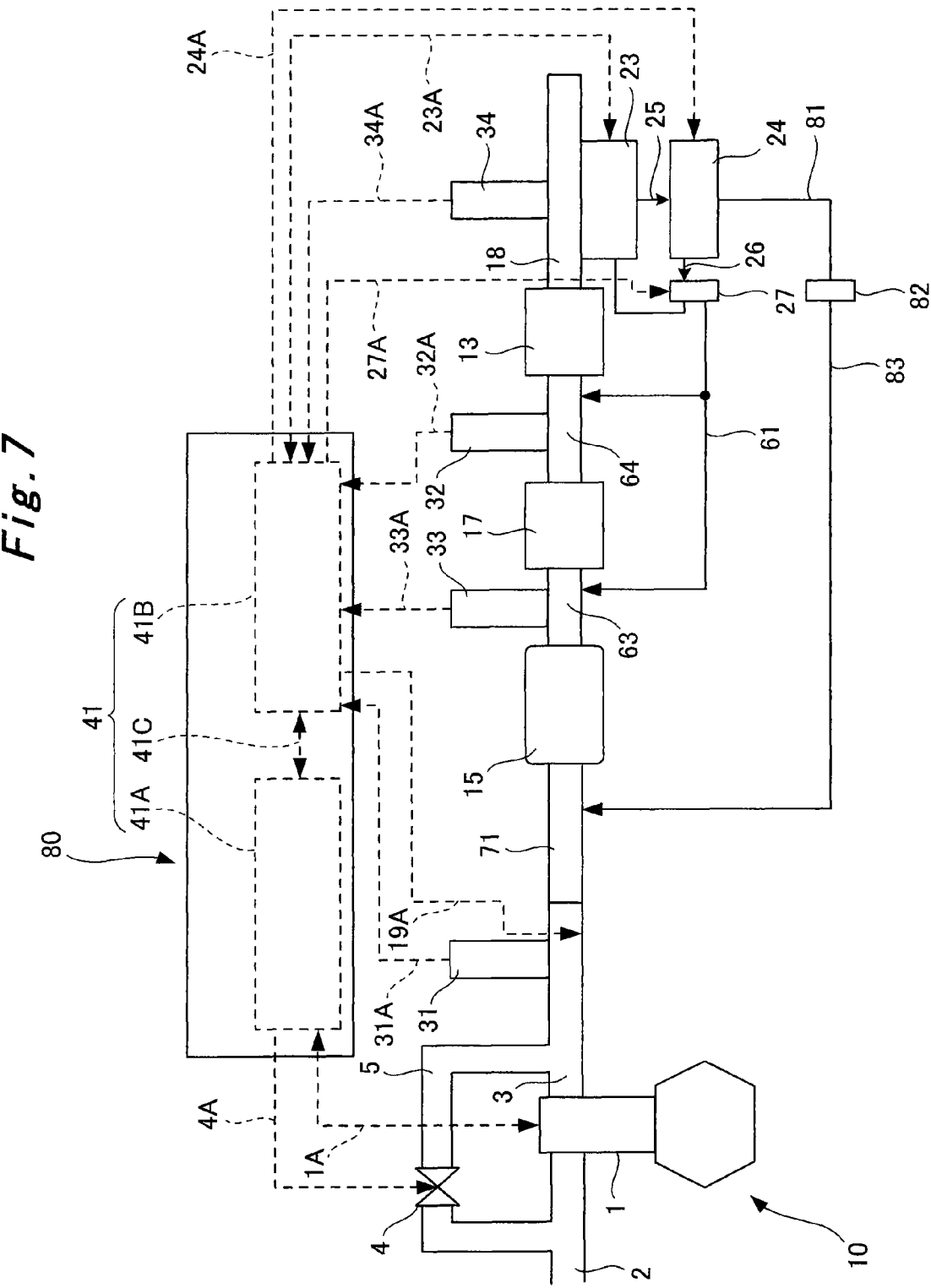
FIG. 7 is a schematic configurational drawing of a third embodiment of an exhaust gas purification system according to the present invention.

FIG. 7 is a schematic configurational drawing of a third embodiment of the exhaust gas purification system according to the present invention.

The exhaust gas purification system according to the third embodiment of the present invention is one in which the positions of the DPF and the second oxidation catalyst provided in the exhaust gas purification system according to the first embodiment of the present invention mentioned above are interchanged, and a hydrogen feed pipe for feeding hydrogen obtained by the water electrolysis device to the upstream side in the exhaust gas flow-through direction of the $NO_x$ purification device is added, while the microreactor is eliminated. The other features are the same as those in the exhaust gas purification system according to the first embodiment of the present invention.

In the exhaust gas purification system according to the third embodiment of the present invention, the same devices as those in the above-mentioned exhaust gas purification system according to the first embodiment of the present invention are assigned the same numerals as those in the latter system, and their explanations are omitted.

An exhaust gas purification system 80 according to the third embodiment of the present invention, as shown in FIG. 7, has a collecting exhaust pipe 3, fourth communication piping 71, a $NO_x$ purification device 15, second communication piping 63, a second oxidation catalyst 17, third communication piping 64, a DPF 13, and a muffler 18 arranged in this order on an exhaust path for an exhaust gas of an engine 10 from the upstream side toward the downstream side in the exhaust gas flow-through direction. Hydrogen produced by a water electrolysis device 24 communicates with a hydrogen storage device 82, which stores hydrogen, through a hydrogen communication pipe 81. A hydrogen feed pipe 83 for feeding hydrogen in the exhaust gas flow-through direction of the $NO_x$ purification device 15 is connected to the hydrogen storage device 82.

Thus, hydrogen produced from water by the water electrolysis device 24 is fed to the hydrogen storage device 82 through the hydrogen communication pipe 81, and stored there. If necessary, hydrogen stored in the hydrogen storage device 82 is fed to the upstream side, in the exhaust gas flow-through direction, of the $NO_x$ purification device 15 through the hydrogen feed pipe 83. On the other hand, oxygen produced from water by the water electrolysis device 24 is fed to an oxygen adsorbent 27 through an oxygen feed pipe 26, and stored there. If necessary, oxygen stored in the oxygen adsorbent 27 is fed to the upstream side, in the exhaust gas flow-through direction, of the second oxidation catalyst 17 and the DPF 13 through an oxygen feed pipe 61. As a result, in the $NO_x$ purification device 15, the above hydrogen and nitrogen oxides in the exhaust gas contact at an SCR catalyst installed within the device 15 to reduce and remove the nitrogen oxides. Moreover, oxygen produced by the water electrolysis device 24 is supplied to the upstream side, in the exhaust gas flow-through direction, of the second oxidation catalyst 17 and the DPF 13. Since the oxygen produced by the water electrolysis device 24 is oxygen in the active stage, the oxygen in the active stage can accelerate the oxidation of hydrocarbons and carbon monoxide in the exhaust gas at the second oxidation catalyst 17. When surplus ammonia is contained in the exhaust gas, the oxygen in the active stage can also promote its oxidation. In this manner, the exhaust gas can be purified even further. By the oxygen in the active stage, moreover, fine particles trapped by the DPF 13 can be burned and removed at a low temperature, and the exhaust gas can be purified even further.

Fourth Embodiment

A fourth embodiment, in which the exhaust gas purification system and the exhaust gas purification method according to the present invention are applied to purification of an exhaust gas discharged from an automobile, will be described using a drawing.

Figure 8:
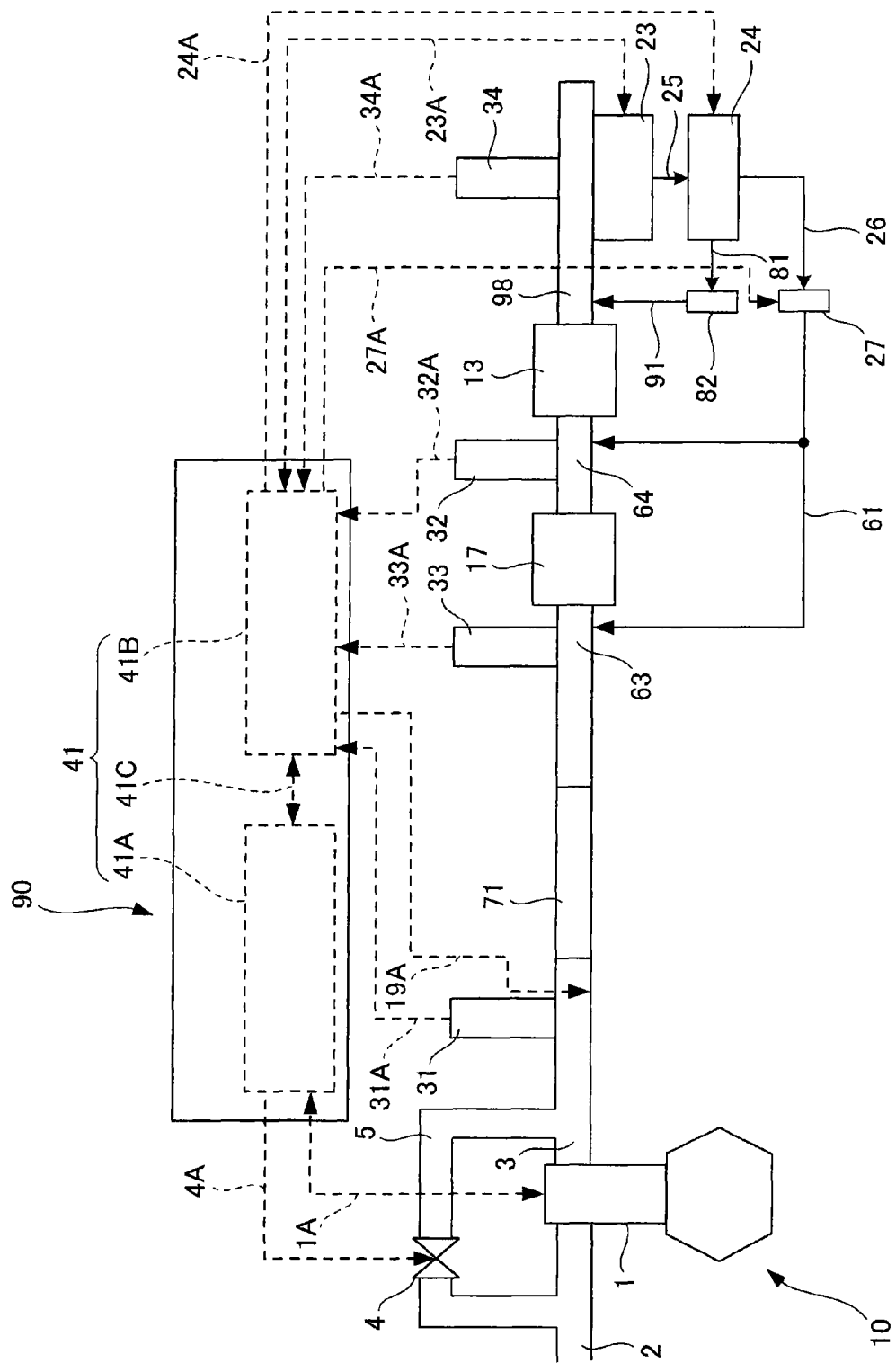
FIG. 8 is a schematic configurational drawing of a fourth embodiment of an exhaust gas purification system according to the present invention.

FIG. 8 is a schematic configurational drawing of the exhaust gas purification system.

The exhaust gas purification system according to the fourth embodiment of the present invention is one in which the $NO_x$ purification device provided in the exhaust gas purification system according to the third embodiment of the present invention is installed within the muffler. The other features are the same as those in the exhaust gas purification system according to the third embodiment of the present invention.

In the exhaust gas purification system according to the fourth embodiment of the present invention, the same devices as those in the above-mentioned exhaust gas purification system according to the third embodiment of the present invention are assigned the same numerals as those in the latter system, and their explanations are omitted.

An exhaust gas purification system 90 according to the fourth embodiment of the present invention, as shown in FIG. 8, has a collecting exhaust pipe 3, fourth communication piping 71, second communication piping 63, a second oxidation catalyst 17, third communication piping 64, a DPF 13, and a muffler 98 arranged in this order on an exhaust path for an exhaust gas of an engine 10 from the upstream side toward the downstream side in the exhaust gas flow-through direction.

However, a $NO_x$ purification device is disposed within the muffler 98. This $NO_x$ purification device, as stated above, has the SCR catalyst where hydrogen as a reducing agent and nitrogen oxides in the exhaust gas contact to reduce and remove the nitrogen oxides. Hydrogen produced by a water electrolysis device 24 communicates with a hydrogen storage device 82, which stores hydrogen, through a hydrogen communication pipe 81. A hydrogen feed pipe 91 for feeding hydrogen to the muffler 98 is connected to the hydrogen storage device 82.

The above-mentioned muffler 98 has a plurality of chambers, and not only lowers the temperature of the exhaust gas to a temperature, for example, of the order of 200° C., and decreases the pressure of the exhaust gas, but also cuts down on noises.

According to the exhaust gas purification system 90, since the $NO_x$ purification device is disposed within the muffler 98, the muffler 98 itself lowers the exhaust gas temperature, as mentioned above, and an oxidation reaction between oxygen contained in the exhaust gas brought to the low temperature and hydrogen as a reducing agent can be suppressed. At the SCR catalyst, nitrogen oxides in the exhaust gas and hydrogen as the reducing agent can be allowed to contact, whereby reduction and removal of the nitrogen oxides can be always performed. As a result, it is not necessary to use ammonia, which has so far been used as a reducing agent when the exhaust gas temperature is high. Thus, an ammonia production device and a device for treating ammonia after passage through the SCR catalyst become unnecessary, so that the system can be rendered compact, and the cost for the system can be decreased. Further, the flow velocity of the exhaust gas flowing through the site of installation of the SCR catalyst is so low that the duration of contact between the nitrogen oxides in the exhaust gas and the SCR catalyst is lengthened to increase the reduction reaction rate of the nitrogen oxides. Consequently, the amount of the SCR catalyst disposed at the above-mentioned site can be decreased, and a compact system and cost reduction can be realized.

The exhaust gas purification system 90 having the $NO_x$ purification device (SCR catalyst) disposed within the muffler 98 has bee used in the above descriptions. However, it is permissible to adopt an exhaust gas purification system having the SCR catalyst disposed at that site of the exhaust path for discharge of the exhaust gas to the atmosphere which is at the exhaust gas temperature of 200° C. or lower. Even with such an exhaust gas purification system, like the above-mentioned exhaust gas purification system 90, an oxidation reaction between oxygen contained in the exhaust gas and hydrogen as a reducing agent can be suppressed. At the reduction catalyst, nitrogen oxides in the exhaust gas and hydrogen as the reducing agent can be allowed to contact, whereby reduction and removal of the nitrogen oxides can be always performed. As a result, it is not necessary to use ammonia, which has so far been used as a reducing agent when the exhaust gas temperature is high. Thus, an ammonia production device and a device for treating ammonia after passage through the reduction catalyst become unnecessary, so that the system can be rendered compact, and the cost for the system can be decreased.

Other Embodiments

The above-described first to fourth embodiments of the exhaust gas purification system and the exhaust gas purification method according to the present invention have been described using the exhaust gas purification systems 50, 60, 70, 80 and 90 applied to the automobile. However, the above exhaust gas purification systems 50, 60, 70, 80 and 90 can also be applied to equipment having a stationary internal combustion engine. Even such equipment exhibits the same actions and effects as those of the above exhaust gas purification systems 50, 60, 70, 80 and 90.

The invention claimed is:

1. An exhaust gas purification system, comprising:
   a reduction catalyst for reducing and removing nitrogen oxides in an exhaust gas from an internal combustion engine by bringing the nitrogen oxides into contact with a reducing agent;
   an oxidation catalyst for oxidizing gas components in the exhaust gas;
   water electrolysis means for electrolyzing water to produce hydrogen and oxygen;
   hydrogen supply means for supplying the hydrogen produced by the water electrolysis means to an upstream side in an exhaust gas flow-through direction of the reduction catalyst;
   oxygen supply means for supplying the oxygen produced by the water electrolysis means to the exhaust gas;
   particulate matter removing means for trapping, burning and removing particulate matter contained in the exhaust gas, wherein the oxygen supply means has second oxygen supply means for supplying the oxygen to an upstream side in the exhaust gas flow-through direction of the particulate matter removing means;
   ozone producing means for producing ozone from the oxygen obtained by the water electrolysis means; and ozone supply means for supplying the ozone obtained by the ozone producing means to the upstream side in the exhaust gas flow-through direction of, at least, the oxidation catalyst among the oxidation catalyst and the particulate matter removing means.

2. The exhaust gas purification system according to claim 1, wherein
the reduction catalyst is disposed at a site of an exhaust path for discharge of the exhaust gas to an atmosphere, the site where a temperature of the exhaust gas is 200° C. or lower.

3. The exhaust gas purification system according to claim 2, wherein
the reduction catalyst is disposed within a muffler for discharging the exhaust gas to the atmosphere.

4. The exhaust gas purification system according to claim 1, wherein
the oxygen supply means has first oxygen supply means for supplying the oxygen to an upstream side in the exhaust gas flow-through direction of the oxidation catalyst.

5. The exhaust gas purification system according to claim 1, further comprising
oxygen storage means for storing the oxygen produced by the water electrolysis means.

6. The exhaust gas purification system according to claim 1, further comprising:
first gas component measuring means, disposed on the upstream side in the exhaust gas flow-through direction of the reduction catalyst, for measuring a concentration of the nitrogen oxides in the exhaust gas; and
second gas component measuring means, disposed on a downstream side in the exhaust gas flow-through direction of the reduction catalyst, for measuring concentrations of the nitrogen oxides and the reducing agent in the exhaust gas.

7. The exhaust gas purification system according to claim 1, further comprising
water recovery means, disposed in a vicinity of an outlet of an exhaust passage for the exhaust gas, for recovering water in the exhaust gas, and
wherein the water is at least one of the water recovered by the water recovery means, and water supplied from an outside.

8. The exhaust gas purification system according to claim 1, further comprising:
water storage means for storing the water; and
water supply means for supplying the water stored in the water storage means to the water electrolysis means.

9. The exhaust gas purification system according to claim 1, which is installed on an automobile and wherein the internal combustion engine is an engine of the automobile.

10. The exhaust gas purification system according to claim 9, wherein
the automobile has at least one of a car air conditioner, a cooling water reserve tank, and a rainwater storage tank, and
the water is at least one of drain from the car air conditioner, cooling water within the cooling water reserve tank, and water within the rainwater storage tank.

* * * * *